(12) United States Patent
Hegde et al.

(10) Patent No.: US 10,073,652 B2
(45) Date of Patent: Sep. 11, 2018

(54) PERFORMANCE OPTIMIZED STORAGE VAULTS IN A DISPERSED STORAGE NETWORK

(71) Applicant: International Business Machines Corporation, Armonk, NY (US)

(72) Inventors: Harsha Hegde, Hawthorn Woods, IL (US); Wesley B. Leggette, Chicago, IL (US)

(73) Assignee: International Business Machines Corporation, Armonk, NY (US)

( * ) Notice: Subject to any disclaimer, the term of this patent is extended or adjusted under 35 U.S.C. 154(b) by 48 days.

(21) Appl. No.: 15/218,743

(22) Filed: Jul. 25, 2016

(65) Prior Publication Data

US 2017/0091030 A1 Mar. 30, 2017

Related U.S. Application Data

(60) Provisional application No. 62/222,819, filed on Sep. 24, 2015.

(51) Int. Cl.
*G11C 29/00* (2006.01)
*G06F 3/06* (2006.01)
(Continued)

(52) U.S. Cl.
CPC ............ *G06F 3/0653* (2013.01); *G06F 3/064* (2013.01); *G06F 3/067* (2013.01); *G06F 3/0611* (2013.01);
(Continued)

(58) Field of Classification Search
CPC ......... H04N 21/64723; H04N 7/17318; H04N 21/2187; H04N 21/234363;
(Continued)

(56) References Cited

U.S. PATENT DOCUMENTS 4,092,732 A 5/1978 Ouchi
5,454,101 A 9/1995 Mackay et al.
(Continued)

OTHER PUBLICATIONS

Shamir; How to Share a Secret; Communications of the ACM; vol. 22, No. 11; Nov. 1979; pp. 612-613.
(Continued)

*Primary Examiner* — Guerrier Merant
(74) *Attorney, Agent, or Firm* — Garlick & Markison; Timothy W. Markison; Shayne X. Short

(57) ABSTRACT

Methods for use in a dispersed storage network (DSN) to enable rapid retrieval of data. A first set of storage units of the DSN is configured as a performance optimized internal vault that utilizes dispersed error encoding/decoding parameters which provide improved data access performance in relation to a second set of storage units. Upon receiving a data object for storage, a computing device of the DSN determines, based on at least one performance criterion, to store the data object in the performance optimized internal vault as opposed to the second set of storage units. The data object is then dispersed storage error encoded, in accordance with dispersal parameters associated with storage of data in the internal vault, to produce a plurality of sets of performance encoded data slices, wherein the data object is segmented and each resulting data segment is encoded into a respective set of performance encoded data slices.

20 Claims, 7 Drawing Sheets

(51) Int. Cl.

| | | |
|---|---|---|
| *H04L 29/06* | (2006.01) | |
| *G06F 8/65* | (2018.01) | |
| *H04L 29/08* | (2006.01) | |
| *G06F 11/10* | (2006.01) | |
| *H03M 13/15* | (2006.01) | |
| *H03M 13/37* | (2006.01) | |

(52) U.S. Cl.
CPC .......... *G06F 3/0619* (2013.01); *G06F 3/0659* (2013.01); *G06F 3/0661* (2013.01); *G06F 8/65* (2013.01); *G06F 11/1092* (2013.01); *H03M 13/154* (2013.01); *H03M 13/3761* (2013.01); *H04L 63/061* (2013.01); *H04L 67/1097* (2013.01); *H04L 67/32* (2013.01); *H04L 67/34* (2013.01); *H03M 13/1515* (2013.01); *H04L 67/02* (2013.01); *H04L 67/06* (2013.01); *H04L 67/42* (2013.01)

(58) Field of Classification Search
CPC .......... H04N 21/2347; H04N 21/8549; H04N 21/41407; H04N 21/4758; H04N 21/6131; H04N 21/84; H04N 21/2221; H04N 7/165; H04N 21/235; H04N 21/23106; H04N 21/2355; H04N 21/2381
See application file for complete search history.

(56) References Cited

U.S. PATENT DOCUMENTS

| | | | |
|---|---|---|---|
| 5,485,474 A | 1/1996 | Rabin | |
| 5,774,643 A | 6/1998 | Lubbers et al. | |
| 5,802,364 A | 9/1998 | Senator et al. | |
| 5,809,285 A | 9/1998 | Hilland | |
| 5,890,156 A | 3/1999 | Rekieta et al. | |
| 5,987,622 A | 11/1999 | Lo Verso et al. | |
| 5,991,414 A | 11/1999 | Garay et al. | |
| 6,012,159 A | 1/2000 | Fischer et al. | |
| 6,058,454 A | 5/2000 | Gerlach et al. | |
| 6,128,277 A | 10/2000 | Bruck et al. | |
| 6,175,571 B1 | 1/2001 | Haddock et al. | |
| 6,192,472 B1 | 2/2001 | Garay et al. | |
| 6,256,688 B1 | 7/2001 | Suetaka et al. | |
| 6,272,658 B1 | 8/2001 | Steele et al. | |
| 6,301,604 B1 | 10/2001 | Nojima | |
| 6,356,949 B1 | 3/2002 | Katsandres et al. | |
| 6,366,995 B1 | 4/2002 | Vilkov et al. | |
| 6,374,336 B1 | 4/2002 | Peters et al. | |
| 6,415,373 B1 | 7/2002 | Peters et al. | |
| 6,418,539 B1 | 7/2002 | Walker | |
| 6,449,688 B1 | 9/2002 | Peters et al. | |
| 6,567,948 B2 | 5/2003 | Steele et al. | |
| 6,571,282 B1 | 5/2003 | Bowman-Amuah | |
| 6,609,223 B1 | 8/2003 | Wolfgang | |
| 6,658,661 B1* | 12/2003 | Arsenault ............... | H04H 40/90 348/E5.099 |
| 6,678,855 B1* | 1/2004 | Gemmell ............ | H03M 13/373 709/231 |
| 6,718,361 B1 | 4/2004 | Basani et al. | |
| 6,760,808 B2 | 7/2004 | Peters et al. | |
| 6,785,768 B2 | 8/2004 | Peters et al. | |
| 6,785,783 B2 | 8/2004 | Buckland | |
| 6,826,711 B2 | 11/2004 | Moulton et al. | |
| 6,879,596 B1 | 4/2005 | Dooply | |
| 7,003,688 B1 | 2/2006 | Pittelkow et al. | |
| 7,024,451 B2 | 4/2006 | Jorgenson | |
| 7,024,609 B2 | 4/2006 | Wolfgang et al. | |
| 7,080,101 B1 | 7/2006 | Watson et al. | |
| 7,103,824 B2 | 9/2006 | Halford | |
| 7,103,915 B2 | 9/2006 | Redlich et al. | |
| 7,111,115 B2 | 9/2006 | Peters et al. | |
| 7,140,044 B2 | 11/2006 | Redlich et al. | |
| 7,146,644 B2 | 12/2006 | Redlich et al. | |
| 7,171,493 B2 | 1/2007 | Shu et al. | |
| 7,222,133 B1 | 5/2007 | Raipurkar et al. | |
| 7,240,236 B2 | 7/2007 | Cutts et al. | |
| 7,272,613 B2 | 9/2007 | Sim et al. | |
| 7,327,761 B2* | 2/2008 | Rajwan ................ | H04L 1/0002 370/468 |
| 7,636,724 B2 | 12/2009 | de la Torre et al. | |
| 9,785,351 B2* | 10/2017 | Resch ..................... | G06F 3/061 |
| 2002/0062422 A1 | 5/2002 | Butterworth et al. | |
| 2002/0166079 A1 | 11/2002 | Ulrich et al. | |
| 2003/0018927 A1 | 1/2003 | Gadir et al. | |
| 2003/0037261 A1 | 2/2003 | Meffert et al. | |
| 2003/0065617 A1 | 4/2003 | Watkins et al. | |
| 2003/0084020 A1 | 5/2003 | Shu | |
| 2004/0024963 A1 | 2/2004 | Talagala et al. | |
| 2004/0034712 A1* | 2/2004 | Rajwan ................ | H04L 1/0002 709/231 |
| 2004/0122917 A1 | 6/2004 | Menon et al. | |
| 2004/0181811 A1* | 9/2004 | Rakib .................... | H04L 63/062 725/122 |
| 2004/0215998 A1 | 10/2004 | Buxton et al. | |
| 2004/0228493 A1 | 11/2004 | Ma et al. | |
| 2005/0100022 A1 | 5/2005 | Ramprashad | |
| 2005/0114594 A1 | 5/2005 | Corbett et al. | |
| 2005/0125593 A1 | 6/2005 | Karpoff et al. | |
| 2005/0131993 A1 | 6/2005 | Fatula, Jr. | |
| 2005/0132070 A1 | 6/2005 | Redlich et al. | |
| 2005/0144382 A1 | 6/2005 | Schmisseur | |
| 2005/0229069 A1 | 10/2005 | Hassner | |
| 2006/0047907 A1 | 3/2006 | Shiga et al. | |
| 2006/0136448 A1 | 6/2006 | Cialini et al. | |
| 2006/0156059 A1 | 7/2006 | Kitamura | |
| 2006/0224603 A1 | 10/2006 | Correll, Jr. | |
| 2007/0079081 A1 | 4/2007 | Gladwin et al. | |
| 2007/0079082 A1 | 4/2007 | Gladwin et al. | |
| 2007/0079083 A1 | 4/2007 | Gladwin et al. | |
| 2007/0088970 A1 | 4/2007 | Buxton et al. | |
| 2007/0174192 A1 | 7/2007 | Gladwin et al. | |
| 2007/0214285 A1 | 9/2007 | Au et al. | |
| 2007/0234110 A1 | 10/2007 | Soran et al. | |
| 2007/0283167 A1 | 12/2007 | Venters, III et al. | |
| 2009/0052583 A1* | 2/2009 | Shin ..................... | H04N 5/4401 375/321 |
| 2009/0094251 A1 | 4/2009 | Gladwin et al. | |
| 2009/0094318 A1 | 4/2009 | Gladwin et al. | |
| 2009/0170607 A1* | 7/2009 | Chiao ..................... | H04H 20/91 463/42 |
| 2010/0023524 A1 | 1/2010 | Gladwin et al. | |
| 2010/0037002 A1* | 2/2010 | Bennett ................. | G06F 3/0607 711/103 |
| 2012/0054581 A1* | 3/2012 | Grube .................. | G06F 3/0619 714/769 |
| 2012/0311068 A1* | 12/2012 | Gladwin ............... | H04L 65/602 709/214 |
| 2014/0317224 A1* | 10/2014 | Resch ................. | G06F 11/1076 709/213 |
| 2014/0337394 A1* | 11/2014 | Baptist ................ | G06F 11/1448 707/827 |
| 2014/0337684 A1* | 11/2014 | Resch ..................... | G06F 11/10 714/763 |

OTHER PUBLICATIONS

Rabin; Efficient Dispersal of Information for Security, Load Balancing, and Fault Tolerance; Journal of the Association for Computer Machinery; vol. 36, No. 2; Apr. 1989; pp. 335-348.

Chung; An Automatic Data Segmentation Method for 3D Measured Data Points; National Taiwan University; pp. 1-8; 1998.

Plank, T1: Erasure Codes for Storage Applications; FAST2005, 4th Usenix Conference on File Storage Technologies; Dec. 13-16, 2005; pp. 1-74.

Wildi; Java iSCSi Initiator; Master Thesis; Department of Computer and Information Science, University of Konstanz; Feb. 2007; 60 pgs.

Legg; Lightweight Directory Access Protocol (LDAP): Syntaxes and Matching Rules; IETF Network Working Group; RFC 4517; Jun. 2006; pp. 1-50.

(56) References Cited

OTHER PUBLICATIONS

Zeilenga; Lightweight Directory Access Protocol (LDAP): Internationalized String Preparation; IETF Network Working Group; RFC 4518; Jun. 2006; pp. 1-14.
Smith; Lightweight Directory Access Protocol (LDAP): Uniform Resource Locator; IETF Network Working Group; RFC 4516; Jun. 2006; pp. 1-15.
Smith; Lightweight Directory Access Protocol (LDAP): String Representation of Search Filters; IETF Network Working Group; RFC 4515; Jun. 2006; pp. 1-12.
Zeilenga; Lightweight Directory Access Protocol (LDAP): Directory Information Models; IETF Network Working Group; RFC 4512; Jun. 2006; pp. 1-49.
Sciberras; Lightweight Directory Access Protocol (LDAP): Schema for User Applications; IETF Network Working Group; RFC 4519; Jun. 2006; pp. 1-33.
Harrison; Lightweight Directory Access Protocol (LDAP): Authentication Methods and Security Mechanisms; IETF Network Working Group; RFC 4513; Jun. 2006; pp. 1-32.
Zeilenga; Lightweight Directory Access Protocol (LDAP): Technical Specification Road Map; IETF Network Working Group; RFC 4510; Jun. 2006; pp. 1-8.
Zeilenga; Lightweight Directory Access Protocol (LDAP): String Representation of Distinguished Names; IETF Network Working Group; RFC 4514; Jun. 2006; pp. 1-15.
Sermersheim; Lightweight Directory Access Protocol (LDAP): The Protocol; IETF Network Working Group; RFC 1511; Jun. 2006; pp. 1-68.
Satran, et al.; Internet Small Computer Systems Interface (iSCSI); IETF Network Working Group; RFC 3720; Apr. 2004; pp. 1-257.
Xin, et al.; Evaluation of Distributed Recovery in Large-Scale Storage Systems; 13th IEEE International Symposium on High Performance Distributed Computing; Jun. 2004; pp. 172-181.
Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

\* cited by examiner

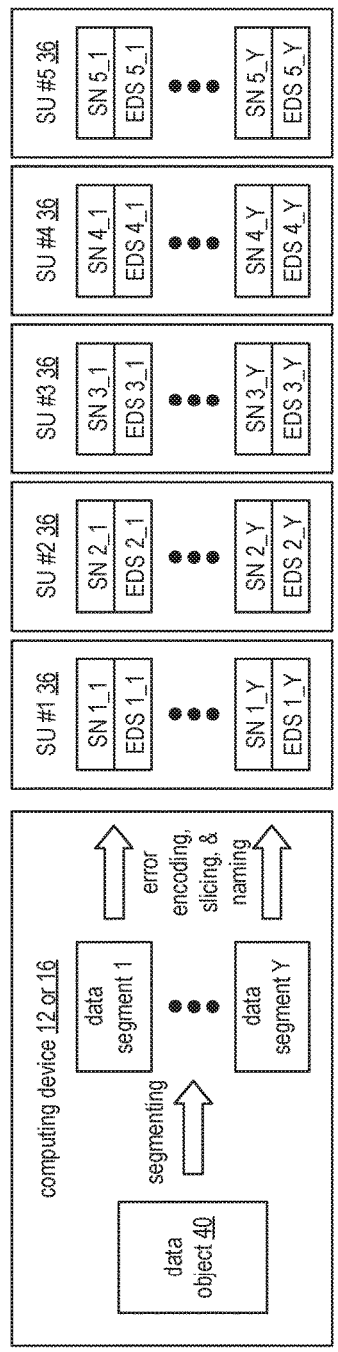
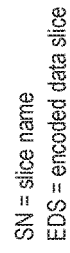
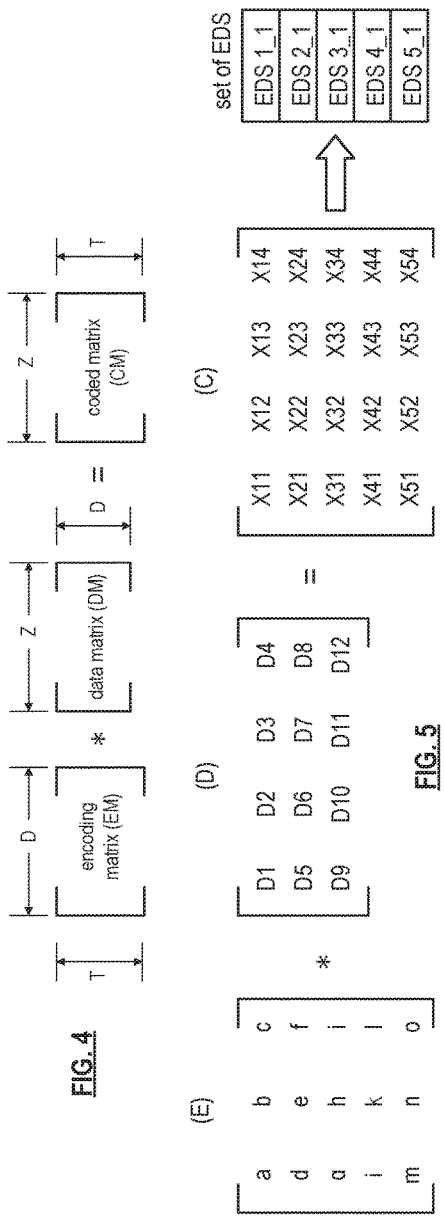

PERFORMANCE OPTIMIZED STORAGE VAULTS IN A DISPERSED STORAGE NETWORK

CROSS-REFERENCE TO RELATED APPLICATIONS

This application claims priority pursuant to 35 U.S.C. § 119(e) to U.S. Provisional Application No. 62/222,819, entitled "IDENTIFYING AN ENCODED DATA SLICE FOR REBUILDING," filed Sep. 24, 2015, which is hereby incorporated herein by reference in its entirety and made part of the present U.S. Utility Patent Application for all purposes.

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISC

Not applicable.

BACKGROUND OF THE INVENTION

Technical Field of the Invention

This invention relates generally to computer networks, and more particularly to performance optimized storage vaults in a dispersed storage network.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on a remote storage system. The remote storage system may include a RAID (redundant array of independent disks) system and/or a dispersed storage system that uses an error correction scheme to encode data for storage.

In a RAID system, a RAID controller adds parity data to the original data before storing it across an array of disks. The parity data is calculated from the original data such that the failure of a single disk typically will not result in the loss of the original data. While RAID systems can address certain memory device failures, these systems may suffer from effectiveness, efficiency and security issues. For instance, as more disks are added to the array, the probability of a disk failure rises, which may increase maintenance costs. When a disk fails, for example, it needs to be manually replaced before another disk(s) fails and the data stored in the RAID system is lost. To reduce the risk of data loss, data on a RAID device is often copied to one or more other RAID devices. While this may reduce the possibility of data loss, it also raises security issues since multiple copies of data may be available, thereby increasing the chances of unauthorized access. In addition, co-location of some RAID devices may result in a risk of a complete data loss in the event of a natural disaster, fire, power surge/outage, etc.

BRIEF DESCRIPTION OF THE SEVERAL VIEWS OF THE DRAWING(S)

FIG. 3 is a schematic block diagram of an example of dispersed storage error encoding of data in accordance with the present disclosure;

FIG. 4 is a schematic block diagram of a generic example of an error encoding function in accordance with the present disclosure;

FIG. 5 is a schematic block diagram of a specific example of an error encoding function in accordance with the present disclosure;

FIG. 6 is a schematic block diagram of an example of slice naming information for an encoded data slice (EDS) in accordance with the present disclosure;

DETAILED DESCRIPTION OF THE INVENTION

Figure 1:
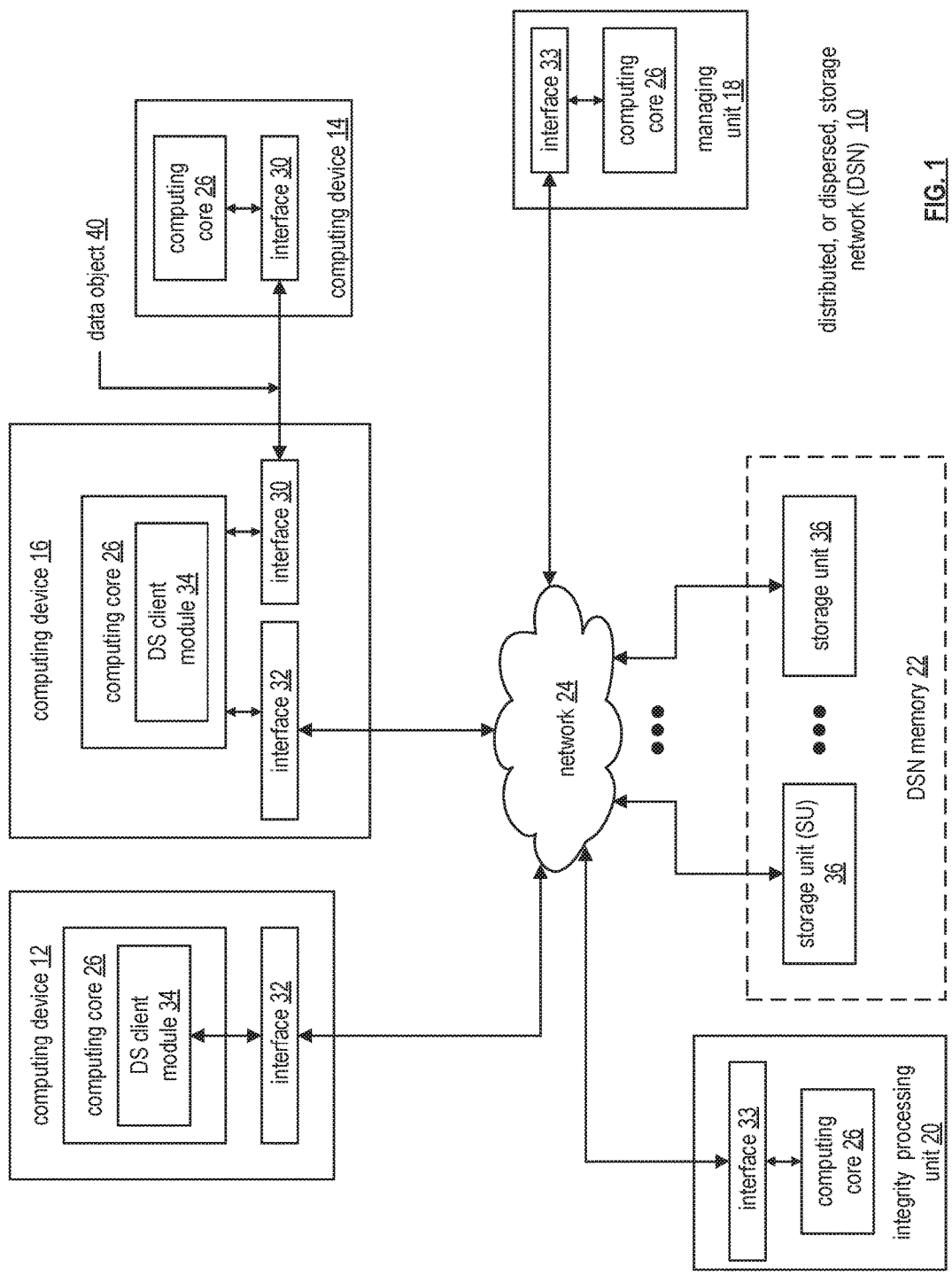
FIG. 1 is a schematic block diagram of an embodiment of a dispersed, or distributed, storage network (DSN) in accordance with the present disclosure.

FIG. 1 is a schematic block diagram of an embodiment of a dispersed, or distributed, storage network (DSN) 10 that includes a plurality of computing devices 12-16, a managing unit 18, an integrity processing unit 20, and a DSN memory 22. The components of the DSN 10 are coupled to a network 24, which may include one or more wireless and/or wire lined communication systems; one or more non-public intranet systems and/or public internet systems; and/or one or more local area networks (LAN) and/or wide area networks (WAN).

Figure 2:
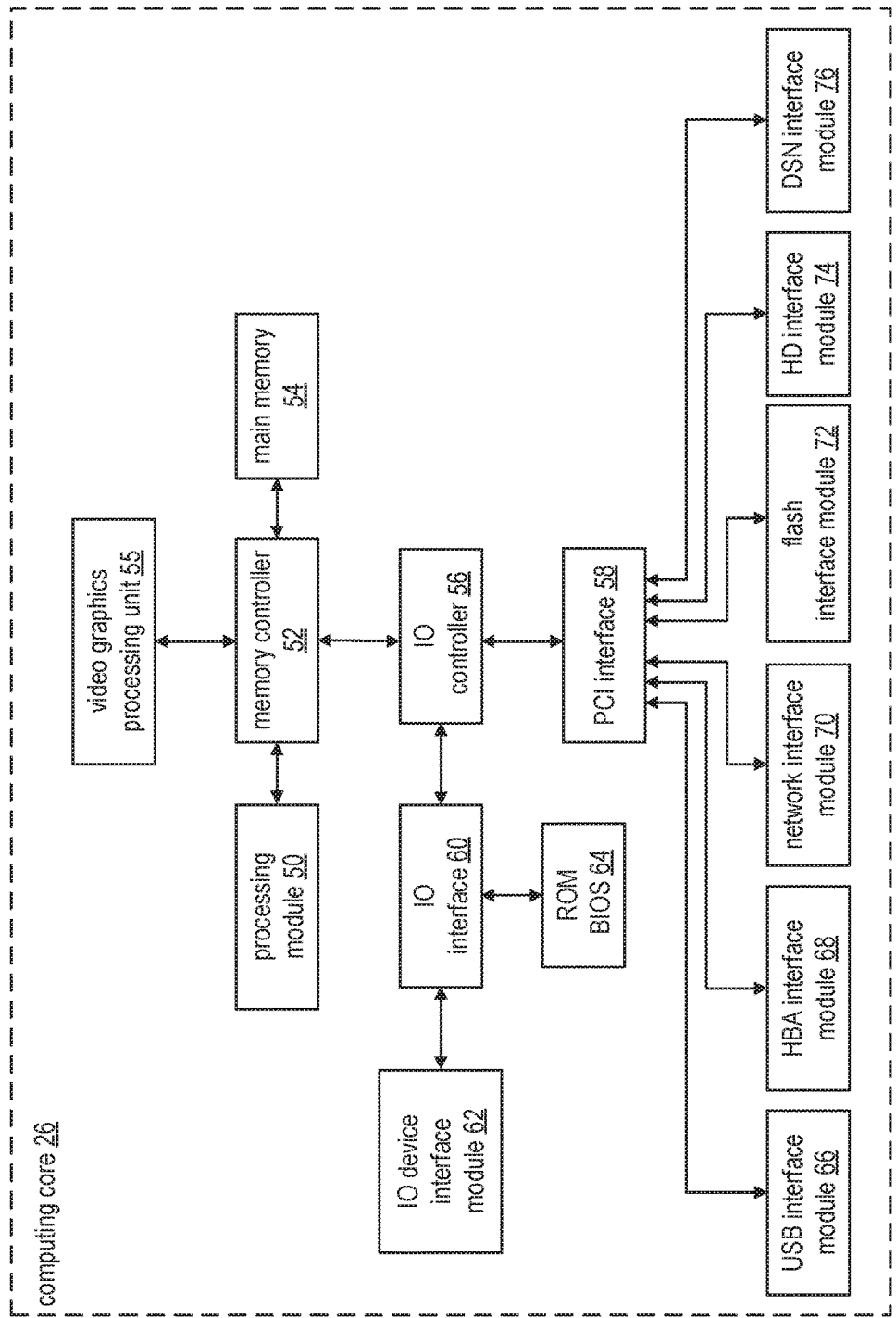
FIG. 2 is a schematic block diagram of an embodiment of a computing core in accordance with the present disclosure.

The DSN memory 22 includes a plurality of storage units 36 that may be located at geographically different sites (e.g., one in Chicago, one in Milwaukee, etc.), at a common site, or a combination thereof. For example, if the DSN memory 22 includes eight storage units 36, each storage unit is located at a different site. As another example, if the DSN memory 22 includes eight storage units 36, all eight storage units are located at the same site. As yet another example, if the DSN memory 22 includes eight storage units 36, a first pair of storage units are at a first common site, a second pair of storage units are at a second common site, a third pair of storage units are at a third common site, and a fourth pair of storage units are at a fourth common site. Note that a DSN memory 22 may include more or less than eight storage units 36. Further note that each storage unit 36 includes a computing core (as shown in FIG. 2, or components thereof) and a plurality of memory devices for storing dispersed storage error encoded data.

Each of the computing devices 12-16, the managing unit 18, and the integrity processing unit 20 include a computing core 26, which includes network interfaces 30-33. Computing devices 12-16 may each be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment. Note that each of the managing unit 18 and the integrity processing unit 20 may be separate computing devices, may be a common computing device, and/or may be integrated into one or more of the computing devices 12-16 and/or into one or more of the storage units 36.

Each interface 30, 32, and 33 includes software and hardware to support one or more communication links via the network 24 indirectly and/or directly. For example, interface 30 supports a communication link (e.g., wired, wireless, direct, via a LAN, via the network 24, etc.) between computing devices 14 and 16. As another example, interface 32 supports communication links (e.g., a wired connection, a wireless connection, a LAN connection, and/or any other type of connection to/from the network 24) between computing devices 12 and 16 and the DSN memory 22. As yet another example, interface 33 supports a communication link for each of the managing unit 18 and the integrity processing unit 20 to the network 24.

Computing devices 12 and 16 include a dispersed storage (DS) client module 34, which enables the computing device to dispersed storage error encode and decode data (e.g., data object 40) as subsequently described with reference to one or more of FIGS. 3-8. In this example embodiment, computing device 16 functions as a dispersed storage processing agent for computing device 14. In this role, computing device 16 dispersed storage error encodes and decodes data on behalf of computing device 14. With the use of dispersed storage error encoding and decoding, the DSN 10 is tolerant of a significant number of storage unit failures (the number of failures is based on parameters of the dispersed storage error encoding function) without loss of data and without the need for a redundant or backup copies of the data. Further, the DSN 10 stores data for an indefinite period of time without data loss and in a secure manner (e.g., the system is very resistant to unauthorized attempts at accessing the data).

In operation, the managing unit 18 performs DS management services. For example, the managing unit 18 establishes distributed data storage parameters (e.g., vault creation, distributed storage parameters, security parameters, billing information, user profile information, etc.) for computing devices 12-14 individually or as part of a group of user devices. As a specific example, the managing unit 18 coordinates creation of a vault (e.g., a virtual memory block associated with a portion of an overall namespace of the DSN) within the DSN memory 22 for a user device, a group of devices, or for public access and establishes per vault dispersed storage (DS) error encoding parameters for a vault. The managing unit 18 facilitates storage of DS error encoding parameters for each vault by updating registry information of the DSN 10, where the registry information may be stored in the DSN memory 22, a computing device 12-16, the managing unit 18, and/or the integrity processing unit 20. The managing unit 18 may also coordinate creation of performance optimized internal storage vaults such as described more fully below in conjunction with FIGS. 9-11.

The managing unit 18 creates and stores user profile information (e.g., an access control list (ACL)) in local memory and/or within memory of the DSN memory 22. The user profile information includes authentication information, permissions, and/or the security parameters. The security parameters may include encryption/decryption scheme, one or more encryption keys, key generation scheme, and/or data encoding/decoding scheme.

The managing unit 18 creates billing information for a particular user, a user group, a vault access, public vault access, etc. For instance, the managing unit 18 tracks the number of times a user accesses a non-public vault and/or public vaults, which can be used to generate per-access billing information. In another instance, the managing unit 18 tracks the amount of data stored and/or retrieved by a user device and/or a user group, which can be used to generate per-data-amount billing information.

As another example, the managing unit 18 performs network operations, network administration, and/or network maintenance. Network operations includes authenticating user data allocation requests (e.g., read and/or write requests), managing creation of vaults, establishing authentication credentials for user devices, adding/deleting components (e.g., user devices, storage units, and/or computing devices with a DS client module 34) to/from the DSN 10, and/or establishing authentication credentials for the storage units 36. Network administration includes monitoring devices and/or units for failures, maintaining vault information, determining device and/or unit activation status, determining device and/or unit loading, and/or determining any other system level operation that affects the performance level of the DSN 10. Network maintenance includes facilitating replacing, upgrading, repairing, and/or expanding a device and/or unit of the DSN 10.

To support data storage integrity verification within the DSN 10, the integrity processing unit 20 (and/or other devices in the DSN 10) may perform rebuilding of 'bad' or missing encoded data slices. At a high level, the integrity processing unit 20 performs rebuilding by periodically attempting to retrieve/list encoded data slices, and/or slice names of the encoded data slices, from the DSN memory 22. Retrieved encoded slices are checked for errors due to data corruption, outdated versioning, etc. If a slice includes an error, it is flagged as a 'bad' or 'corrupt' slice. Encoded data slices that are not received and/or not listed may be flagged as missing slices. Bad and/or missing slices may be subsequently rebuilt using other retrieved encoded data slices that are deemed to be good slices in order to produce rebuilt slices. A multi-stage decoding process may be employed in certain circumstances to recover data even when the number of valid encoded data slices of a set of encoded data slices is less than a relevant decode threshold number. The rebuilt slices may then be written to DSN memory 22. Note that the integrity processing unit 20 may be a separate unit as shown, included in DSN memory 22, included in the computing device 16, and/or distributed among the storage units 36.

FIG. 2 is a schematic block diagram of an embodiment of a computing core 26 that includes a processing module 50, a memory controller 52, main memory 54, a video graphics processing unit 55, an input/output (TO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSN interface module 76.

The DSN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSN interface module 76 and/or the network interface module 70 may function as one or more of the interface 30-33 of FIG. 1. Note that the IO device interface module 62 and/or the memory interface modules 66-76 may be collectively or individually referred to as IO ports.

FIG. 3 is a schematic block diagram of an example of dispersed storage error encoding of data. When a computing device 12 or 16 has data to store it disperse storage error encodes the data in accordance with a dispersed storage error encoding process based on dispersed storage error encoding parameters. The dispersed storage error encoding parameters include an encoding function (e.g., information dispersal algorithm, Reed-Solomon, Cauchy Reed-Solomon, systematic encoding, non-systematic encoding, on-line codes, etc.), a data segmenting protocol (e.g., data segment size, fixed, variable, etc.), and per data segment encoding values. The per data segment encoding values include a total, or pillar width, number (T) of encoded data slices per encoding of a data segment (i.e., in a set of encoded data slices); a decode threshold number (D) of encoded data slices of a set of encoded data slices that are needed to recover the data segment; a read threshold number (R) of encoded data slices to indicate a number of encoded data slices per set to be read from storage for decoding of the data segment; and/or a write threshold number (W) to indicate a number of encoded data slices per set that must be accurately stored before the encoded data segment is deemed to have been properly stored. The dispersed storage error encoding parameters may further include slicing information (e.g., the number of encoded data slices that will be created for each data segment) and/or slice security information (e.g., per encoded data slice encryption, compression, integrity checksum, etc.).

In the present example, Cauchy Reed-Solomon has been selected as the encoding function (a generic example is shown in FIG. 4 and a specific example is shown in FIG. 5); the data segmenting protocol is to divide the data object into fixed sized data segments; and the per data segment encoding values include: a pillar width of 5, a decode threshold of 3, a read threshold of 4, and a write threshold of 4. In accordance with the data segmenting protocol, the computing device 12 or 16 divides the data (e.g., a file (e.g., text, video, audio, etc.), a data object, or other data arrangement) into a plurality of fixed sized data segments (e.g., 1 through Y of a fixed size in range of Kilo-bytes to Tera-bytes or more). The number of data segments created is dependent of the size of the data and the data segmenting protocol.

The computing device 12 or 16 then disperse storage error encodes a data segment using the selected encoding function (e.g., Cauchy Reed-Solomon) to produce a set of encoded data slices. FIG. 4 illustrates a generic Cauchy Reed-Solomon encoding function, which includes an encoding matrix (EM), a data matrix (DM), and a coded matrix (CM). The size of the encoding matrix (EM) is dependent on the pillar width number (T) and the decode threshold number (D) of selected per data segment encoding values. To produce the data matrix (DM), the data segment is divided into a plurality of data blocks and the data blocks are arranged into D number of rows with Z data blocks per row. Note that Z is a function of the number of data blocks created from the data segment and the decode threshold number (D). The coded matrix is produced by matrix multiplying the data matrix by the encoding matrix.

FIG. 5 illustrates a specific example of Cauchy Reed-Solomon encoding with a pillar number (T) of five and decode threshold number of three. In this example, a first data segment is divided into twelve data blocks (D1-D12). The coded matrix includes five rows of coded data blocks, where the first row of X11-X14 corresponds to a first encoded data slice (EDS 1_1), the second row of X21-X24 corresponds to a second encoded data slice (EDS 2_1), the third row of X31-X34 corresponds to a third encoded data slice (EDS 3_1), the fourth row of X41-X44 corresponds to a fourth encoded data slice (EDS 4_1), and the fifth row of X51-X54 corresponds to a fifth encoded data slice (EDS 5_1). Note that the second number of the EDS designation corresponds to the data segment number. In the illustrated example, the value X11=aD1+bD5+cD9, X12=aD2+bD6+cD10, . . . X53=mD3+nD7+oD11, and X54=mD4+nD8+oD12.

Returning to the discussion of FIG. 3, the computing device also creates a slice name (SN) for each encoded data slice (EDS) in the set of encoded data slices. A typical format for a slice name 80 is shown in FIG. 6. As shown, the slice name (SN) 80 includes a pillar number of the encoded data slice (e.g., one of 1-T), a data segment number (e.g., one of 1-Y), a vault identifier (ID), a data object identifier (ID), and may further include revision level information of the encoded data slices. The slice name functions as at least part of a DSN address for the encoded data slice for storage and retrieval from the DSN memory 22.

As a result of encoding, the computing device 12 or 16 produces a plurality of sets of encoded data slices, which are provided with their respective slice names to the storage units for storage. As shown, the first set of encoded data slices includes EDS 1_1 through EDS 5_1 and the first set of slice names includes SN 1_1 through SN 5_1 and the last set of encoded data slices includes EDS 1_Y through EDS 5_Y and the last set of slice names includes SN 1_Y through SN 5_Y.

Figure 7:
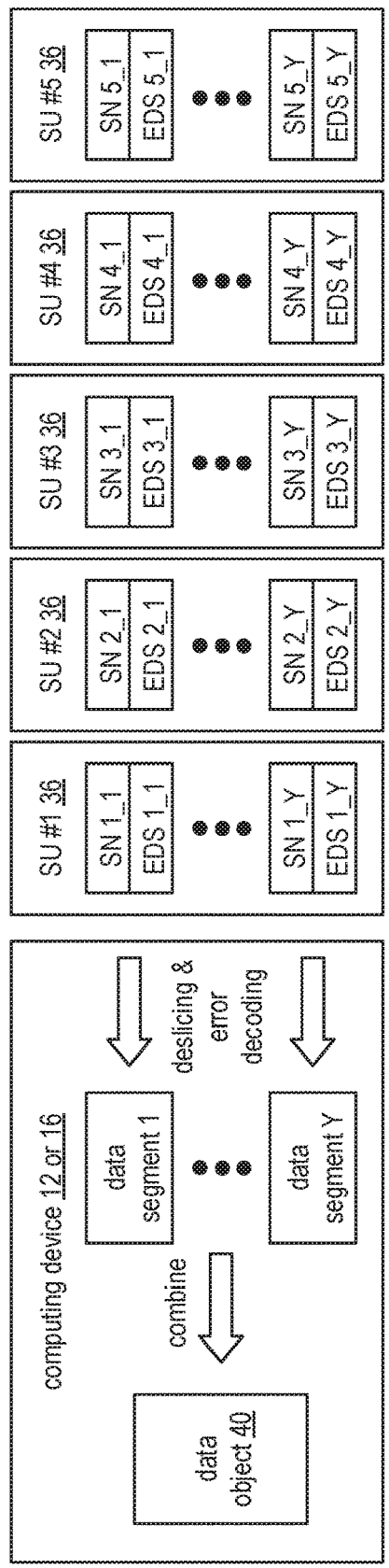
FIG. 7 is a schematic block diagram of an example of dispersed storage error decoding of data in accordance with the present disclosure.

FIG. 7 is a schematic block diagram of an example of dispersed storage error decoding of a data object that was dispersed storage error encoded and stored in the example of FIG. 4. In this example, the computing device 12 or 16 retrieves from the storage units at least the decode threshold number of encoded data slices per data segment. As a specific example, the computing device retrieves a read threshold number of encoded data slices.

Figure 8:
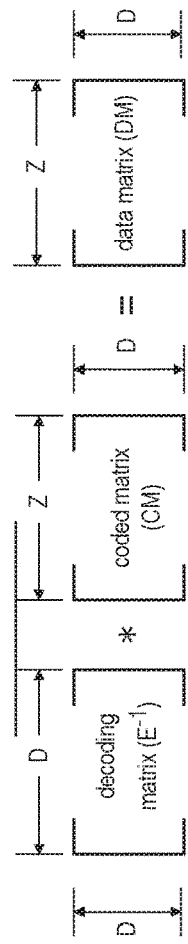
FIG. 8 is a schematic block diagram of a generic example of an error decoding function in accordance with the present disclosure.

In order to recover a data segment from a decode threshold number of encoded data slices, the computing device uses a decoding function as shown in FIG. 8. As shown, the decoding function is essentially an inverse of the encoding function of FIG. 4. The coded matrix includes a decode threshold number of rows (e.g., three in this example) and the decoding matrix in an inversion of the encoding matrix that includes the corresponding rows of the coded matrix. For example, if the coded matrix includes rows 1, 2, and 4, the encoding matrix is reduced to rows 1, 2, and 4, and then inverted to produce the decoding matrix.

Figure 9:
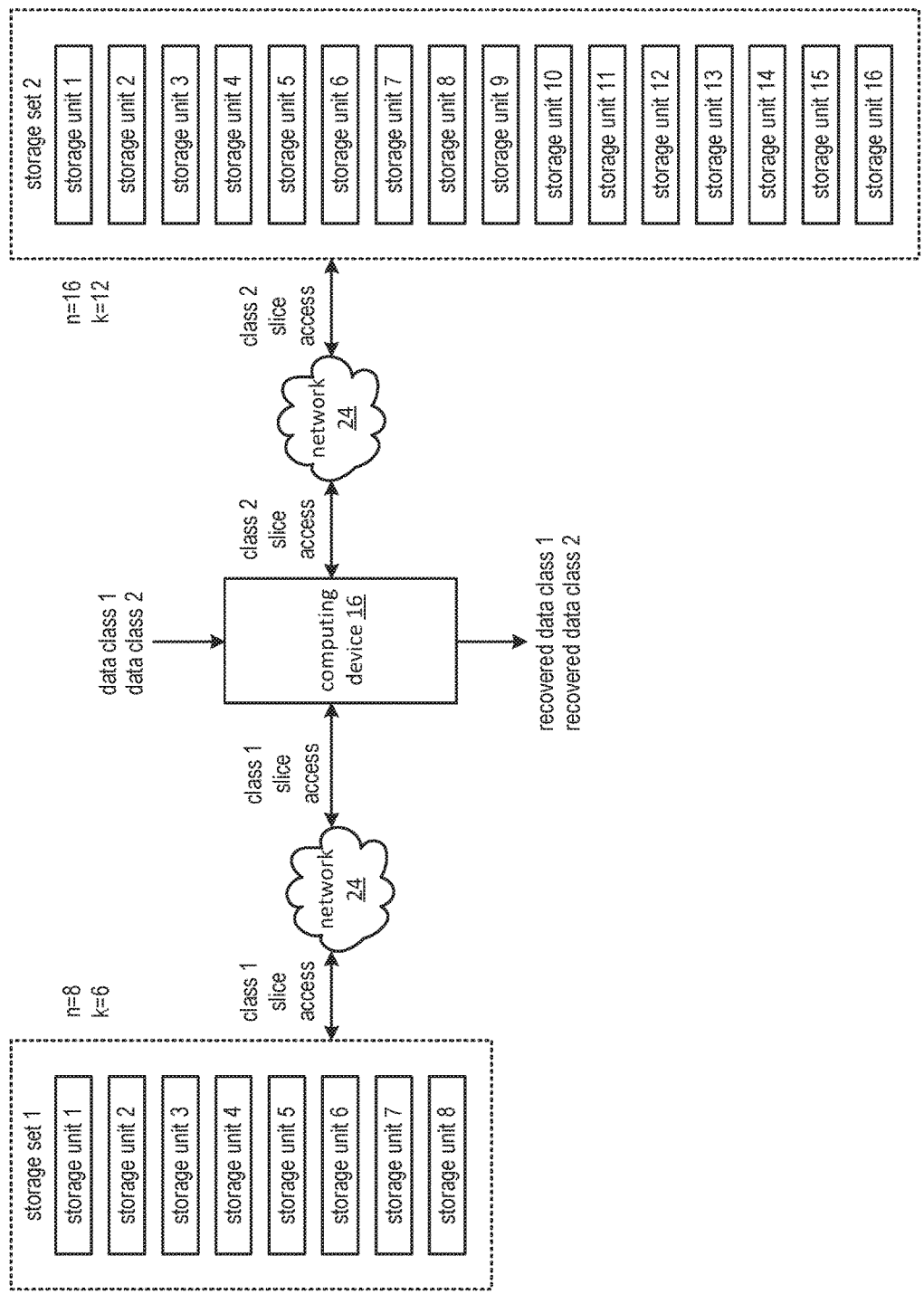
FIG. 9 is a schematic block diagram of an embodiment of a DSN including a performance optimized internal storage vault in accordance with the present disclosure.

FIG. 9 is a schematic block diagram of an embodiment of a dispersed, or distributed, storage network (DSN) including a performance optimized internal storage vault in accordance with the present disclosure. The illustrated DSN includes storage sets 1-2, the network 24 of FIG. 1, and the computing device 16 of FIG. 1. The computing device 16 includes a computing core 26 and DS client module 34 (not separately illustrated). Each storage set includes a set of storage units 1-n (e.g., storage set 1 includes storage units 1-1-1-n). Each storage unit may be implemented utilizing the storage unit 36 depicted in FIG. 1. Hereafter, each storage set may be interchangeably referred to as a set of storage units.

Under certain circumstances, it may be desirable to enable rapid storage and/or retrieval of a particular encoded data slice or set of encoded data slices in a DSN 10. By way of example and without limitation, such circumstances may involve detection of data objects subject to frequent read requests or amendment, data objects not meeting a size threshold level, network load balancing considerations, and/or other performance criteria.

As described more fully below, dispersed storage error encoded data slices (or "encoded data slices") are stored in the storage sets 1-2 in accordance with dispersal parameters optimized for differing levels of storage performance, where data for storage is dispersed storage error encoded utilizing the dispersal parameters and is stored in a corresponding storage set as a plurality of sets of encoded data slices.

A DSN memory automatically configures and deploys performance optimized internal storage vaults (also interchangeably referred to herein as "performance optimized internal vaults" or "internal storage vaults"), which may be vaults that are non-public or not directly accessible by users of a DSN memory, but are available for selective use by computing devices and storage units. In one example, a performance optimized internal vault may only be accessible by computing devices including a DS client module 34 or like functionality. In other exemplary embodiments, the storage units of the performance optimized internal vault may be coupled to one or more computing devices 16 via a speed-optimized communication link (e.g., a high speed fiber optic network or ultra-wideband wireless connection). Further, the storage units of the performance optimized internal vault may be on premise or co-located with a relevant computing device, or proximate a computing device in relation to other sets of storage units of a DSN.

The interval vaults may be established with differing information dispersal algorithm (IDA) parameters, such as reduced IDA thresholds, or reduced error correction capability, in order to increase performance, efficiency, and input/output operations per second (TOPS) capacity. For example, a 6-of-8 IDA configuration might be deployed as an internal storage vault within a DSN memory that is normally used for a wider (e.g., 12-of-16) IDA configuration, thereby supporting read operations with one half the number of read requests otherwise required. Computing devices of the DSN 10 may then opt to store data objects to one or more of these performance optimized internal vaults when those data objects meet certain size and access frequency criteria and/or other performance criteria. The more frequently a data object is accessed, or the smaller the data object, the more prone a computing device of the DSN may be to store the data object in or migrate it to a performance optimized internal vault. When an internal storage vault is using more than a certain amount of storage space, the computing device may determine to remove the least frequently accessed (or the largest) of the data objects which have been stored in the internal storage vault.

Referring more particularly to FIG. 9, data objects are stored in the storage sets 1-2 in accordance with dispersal parameters that include one or more of an IDA width and a decode threshold number, where a decode threshold number of encoded data slices of each set of encoded data slices of the plurality of sets of encoded data slices is required to recover the data. By way of example, the storage set 1 includes storage units 1-8 when the dispersal parameters for storage set 1 include an IDA width of 8 and a decode threshold of 6, and the storage set 2 includes storage units 1-16 when the dispersal parameters for storage set 2 include an IDA width of 16 and a decode threshold number of 12, such that the storage set 1 is to be associated with more favorable speed of access performance as compared to the storage set 2 (e.g., data retrieval is generally faster when there are fewer slices to access).

In operation, the computing device 16 receives data for storage. For example, the computing device 16 receives data objects that may be classified as "data class 1" and "data class 2". Having received a data object for storage, the computing device 16 determines whether to store the received data in a performance optimized internal vault (e.g., storage set 1 in the illustrated embodiment). Such determination may be based on one or more performance criterion such as a data type, a data size indicator, a data owner identifier, system registry information, a predetermination, available capacity level of the performance optimized internal vault, an estimated access frequency level, a DSN network loading level, a subsequent desired access performance level, and a desired data storage reliability level. For example, the computing device 16 determines to utilize the performance optimized internal vault of storage set 1 for storage of the data class 1 when a data size indicator of the data class 1 is less than a size threshold level (e.g., a small data object), and determines to utilize the storage set 2 for storage of the data class 2 when a data size indicator of the data class 2 is greater than the size threshold level (e.g., a large data object). As another example, the computing device 16 determines to utilize the performance optimized internal vault for storage of the data class 1 when an estimated access frequency level of the data class 1 is greater than a frequency of access threshold level. An estimated access frequency level for particular data may be determined in a variety of ways and based on various factors including, for example, access history for the data (including different versions of the data and/or similar or similarly-sourced data), source of the data, and the nature or category of the data itself.

When utilizing the performance optimized internal vault, the computing device 16 dispersed storage error encodes the received data in accordance with dispersal parameters associated with the performance optimized internal vault to produce a plurality of sets of performance encoded data slices. The encoding includes selecting dispersal parameters for performance of storage (e.g., smaller decode threshold number, smaller IDA width). For example, the computing device 16 dispersed storage error encodes the data class 1 utilizing the dispersal parameters of the storage set 1 to produce the plurality of sets of performance encoded data slices.

Having produced the plurality of sets of performance encoded data slices, the computing device 16 sends the plurality of sets of performance encoded data slices to a set of storage units associated with the performance optimized internal vault for storage. For example, the computing device 16 sends, via the network 24, the plurality of sets of performance encoded data slices as class 1 slice accesses (e.g., write slice requests) to the storage units 1-8 of the storage set 1 for storage.

When not utilizing the performance optimized internal vault, the computing device 16 dispersed storage error encodes the received data class 2 in accordance with dispersal parameters associated with the storage set 2 to produce a plurality of sets of encoded data slices and sends, via the network 24, the plurality of sets of encoded data slices as class 2 slice accesses to the storage units of the storage set 2 for storage.

When recovering data, the computing device 16 identifies which storage set was utilized to store the data and retrieves (e.g., via read slice requests) encoded data slices from the identified storage set for decoding to produce recovered data. For example, the computing device 16 recovers the performance encoded data slices from the storage set 1 to reproduce the data class 1.

It is noted that both storage set 1 and storage set 2 may be configured as performance optimized internal vaults subject to differing performance criteria and/or dispersal parameters. Further, a DSN make include additional storage sets not separately illustrated in FIG. 9.

Figure 10:
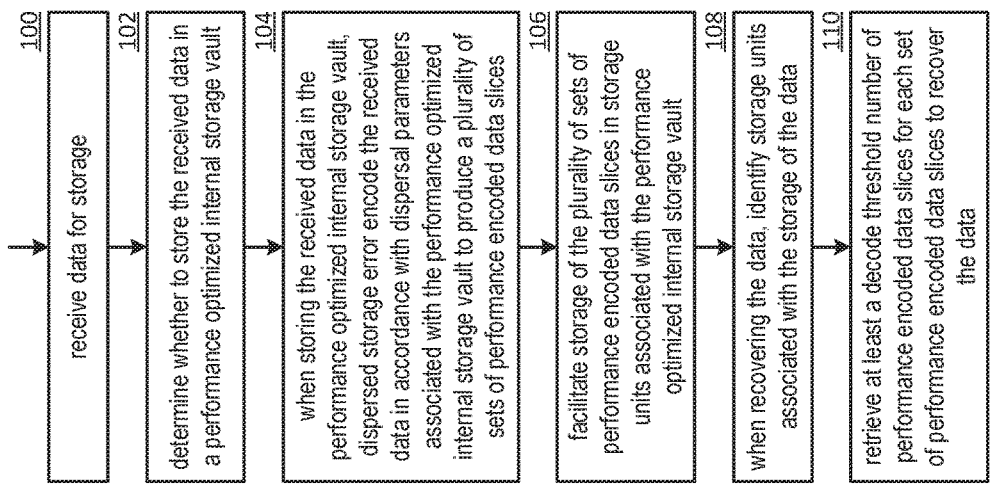
FIG. 10 is a logic diagram of an example of storage resource selection in accordance with the present disclosure.

Referring now to FIG. 10, a logic diagram of an example of storage resource selection in accordance with the present disclosure is shown. In particular, a method is presented for use in conjunction with one or more functions and features described in conjunction with FIGS. 1-9. The method begins at step 100 where a processing module (e.g., of a distributed storage (DS) client module 34 of a computing device 16) receives data for storage. The method continues at step 102 where the processing module determines whether to store the received data in a performance optimized internal storage vault. The determination may be based on one or more performance criterion such as: a data type, a data size indicator, a data owner identifier, system registry information, a predetermination, available capacity level of the performance optimized internal vault, estimated access frequency level of the data, a DSN network loading level, a subsequent desired access performance level, and a desired data storage reliability level.

When storing the received data in the performance optimized internal storage vault, the method continues at step 104 where the processing module dispersed storage error encodes the received data in accordance with dispersal parameters associated with the performance optimized internal vault to produce a plurality of sets of performance encoded data slices. For example, the processing module obtains the dispersal parameters by at least one of extracting the dispersal parameters from system registry information, receiving the dispersal parameters in conjunction with the data to be stored, interpreting a query response, determining a desired performance level, and matching dispersal parameters to a determined performance level.

The method continues at step 106 where the processing module facilitates storage of the plurality of sets of performance encoded data slices in storage units associated with the performance optimized internal storage vault. The facilitating includes one or more of identifying storage units associated with the performance optimized internal storage vault (e.g., by performing a lookup operation or interpreting a query response), and issuing write slice requests to the identified storage units, where the write slice requests include the plurality of sets of performance encoded data slices.

When recovering the data, such as in response to a data recovery request, the method continues at step 108 where the processing module identifies storage units associated with the storage of the data. The identifying may include one or more of interpreting a directory entry, interpreting a dispersed hierarchical index entry, identifying the storage units of the performance optimized internal storage vault based on a data type indicator in a data recovery request, and receiving identifiers of the storage units. The method continues at step 110 where the processing module retrieves at least a decode threshold number of performance encoded data slices for each set of performance encoded data slices to recover the data. For example, the processing module issues read slice requests to the identified storage units, receives performance encoded data slices, and, for each set, dispersed error decodes at least a decode threshold number of received performance encoded data slices to reproduce a data segment of a plurality data segments of the data.

Alternatively, or in addition to, the processing module may recover the data from the performance optimized internal storage vault and facilitate migration and storage of the recovered data in another storage vault/storage set (e.g., a storage set that is not performance optimized) when one or more performance criterion that triggered storage of a data object in a performance optimized internal vault is no longer being met or is superseded by other performance criteria, or when the capacity threshold value for the internal storage vault is reached. Upon confirming storage, the processing module may delete the performance encoded data slices from the storage units of the internal storage vault.

Further, in various embodiments, a storage unit of a set of storage units may apply integrity verification information to an encoded data slice before sending it to a requesting device. For example, when reading an encoded data slice from local memory, the storage unit may determine that the slice data does not match a corresponding stored integrity check value. This can result in an error being returned to the requestor instead of the slice. For example, a storage unit detecting a bad data slice may return a read slice response including the data slice and a flag indicating that the data slice is likely corrupt (e.g., the storage unit may not be able to determine whether the data within the slice is corrupted or the integrity check value is wrong). Upon receiving such an error indication, the requesting device may attempt to correct the encoded data slice, ignore it if a decode threshold number of encoded data slices is received, or send a revised read slice request(s) to another storage unit (e.g., of a performance optimized internal vault) that is storing the relevant data, taking into consideration any differences in the dispersal parameters used to store the data. Likewise, replication of data into an alternate set of storage units such as a performance optimized internal vault may be triggered upon detection of potential data integrity issues regarding the data object or portions thereof as retrieved from a first set of storage units.

Figure 11:
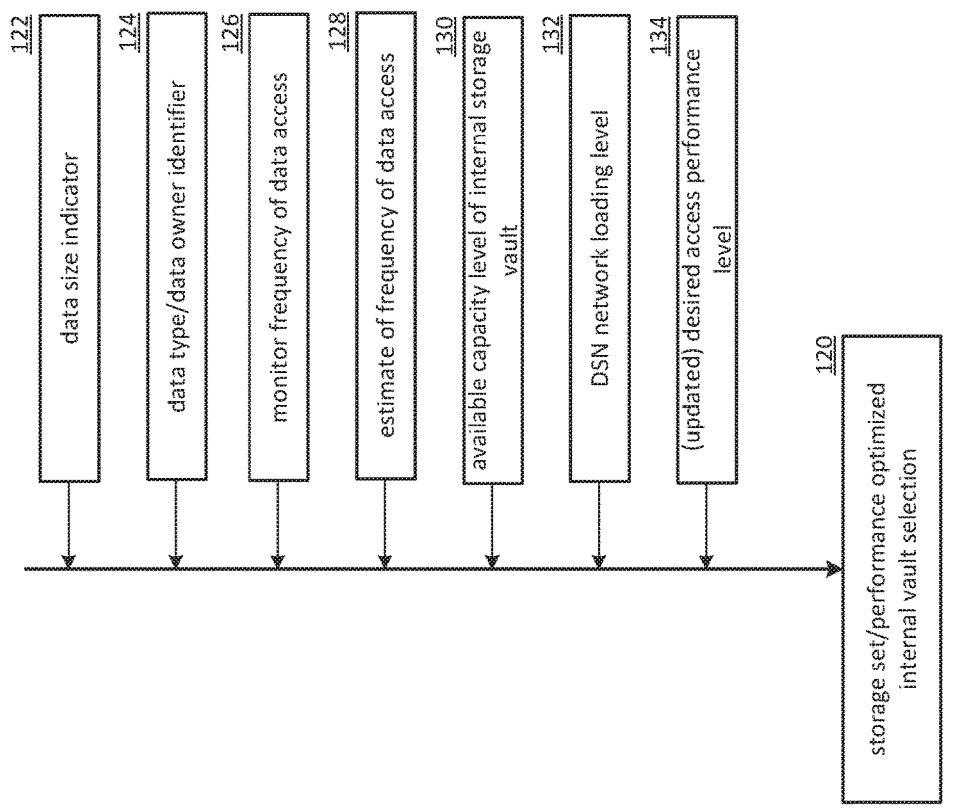
FIG. 11 is a logic diagram of a further example of storage resource selection in accordance with the present disclosure.

FIG. 11 is a logic diagram of a further example of storage resource selection in a DSN in accordance with the present disclosure. In particular, a method is presented for use in conjunction with one or more functions and features described in conjunction with FIGS. 1-10. Various exemplary performance criteria are illustrated for use in selecting between a plurality of sets of storage units for storage of a received data object, wherein at least one of the sets of storage units is configured as a performance optimized internal vault.

In the illustrated example, selection of a storage set may be based on one or more of a data size indicator 122, a data type/data owner identifier 124, a monitored frequency of data access 126, an estimate of frequency of data access 128, a determination of the available capacity level of performance optimized internal storage vault 130, a DSN network loading level 132 (e.g., in relation to data operations involving the plurality of sets of storage units), or a pre-existing or updated desired access performance level 134 associated with the data object. Various other performance criteria may be utilized, including those referenced above in conjunction with FIGS. 9 and 10.

The methods described above in conjunction with the computing device and the storage units can alternatively be performed by other modules of the dispersed storage network or by other devices. For example, any combination of a first module, a second module, a third module, a fourth module, etc. of the computing device and the storage units may perform the method described above. In addition, at least one memory section (e.g., a first memory section, a second memory section, a third memory section, a fourth memory section, a fifth memory section, a sixth memory section, etc. of a non-transitory computer readable storage medium) that stores operational instructions can, when executed by one or more processing modules of one or more computing devices and/or by the storage units of the dispersed storage network (DSN), cause the one or more computing devices and/or the storage units to perform any or all of the method steps described above.

As may be used herein, the terms "substantially" and "approximately" provides an industry-accepted tolerance for its corresponding term and/or relativity between items. Such an industry-accepted tolerance ranges from less than one percent to fifty percent. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from Figure to Figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid state memory, a hard drive memory, cloud memory, thumb drive, server memory, computing device memory, and/or other physical medium for storing digital information. A computer readable memory/storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method for execution by one or more processing modules of one or more computing devices of a dispersed storage network (DSN), the DSN having storage resources including a first set of storage units and a second set of storage units, the first set of storage units configured as an internal storage vault, the method comprises:
   receiving a data object for storage;
   determining, based on at least one performance criterion, to store the data object in the internal storage vault as opposed to the second set of storage units;
   dispersed storage error encoding the data object, in accordance with dispersal parameters associated with storage of data in the internal storage vault, to produce a plurality of sets of performance encoded data slices, wherein the data object is segmented into a plurality of data segments and wherein each data segment is dispersed storage error encoded into a respective set of performance encoded data slices; and
   facilitating storage of the plurality of sets of performance encoded data slices in the internal storage vault.

2. The method of claim 1, wherein the dispersal parameters associated with the internal storage vault differ from second dispersal parameters associated with storage of data in the second set of storage units.

3. The method of claim 2, wherein each of the plurality of sets of performance encoded data slices includes n number of performance encoded data slices, and wherein the second set of storage units is configured to store sets of encoded data slices that each include a second number of encoded data slices, the second number being greater than n.

4. The method of claim 1, wherein the at least one performance criterion includes at least one of: a data type, a data size indicator, a data owner identifier, system registry information, or available capacity level of the internal storage vault.

5. The method of claim 1, wherein the at least one performance criterion includes at least one of: an estimated access frequency level, a DSN network loading level, an updated desired access performance level, or a desired data storage reliability level.

6. The method of claim 1 further comprises:
receiving a data recovery request for the data object;
identifying the set of storage units of the internal storage vault;
issuing read slice requests, to the identified set of storage units, for the performance encoded data slices of the plurality of sets of performance encoded data slices;
receiving the performance encoded data slices; and
for each respective set of performance encoded data slices, dispersed error decoding at least a decode threshold number of received performance encoded data slices to reproduce a data segment of the plurality of data segments.

7. The method of claim 6, wherein identifying the storage units of the internal storage vault includes at least one of: interpreting a directory entry, interpreting a dispersed hierarchical index entry, identifying the storage units based on a data type indicator in the data recovery request, or receiving identifiers corresponding to the storage units.

8. The method of claim 1 further comprises:
determining to migrate the data object from the internal storage vault to the second set of storage units;
retrieving the plurality of sets of performance encoded data slices from the internal storage vault;
dispersed storage error decoding the sets of performance encoded data slices to reproduce the data object;
dispersed storage error encoding the data object, in accordance with dispersal parameters associated with the second set of storage units, to produce a plurality of sets of encoded data slices, wherein the data object is segmented into a plurality of data segments and wherein each data segment is dispersed storage error encoded into a respective set of encoded data slices; and
facilitating storage of the plurality of sets of encoded data slices in the second set of storage units.

9. The method of claim 8, wherein determining to migrate is based on an update to the at least one performance criterion.

10. The method of claim 1, further comprises:
obtaining the dispersal parameters associated with storage of data in the internal storage vault by at least one of: extracting the dispersal parameters from system registry information, receiving the dispersal parameters in conjunction with the data object, interpreting a query response, determining a desired performance level, or matching dispersal encoding parameters to a determined performance level.

11. A computer readable storage medium comprises:
at least one memory section that stores operational instructions that, when executed by one or more processing modules of one or more computing devices of a dispersed storage network (DSN), causes the one or more computing devices to:
determine, based on at least one performance criterion, to store a data object in a first set of storage units of the DSN as opposed to a second set of storage units of the DSN, the first set of storage units configured as an internal storage vault;
dispersed storage error encode the data object, in accordance with dispersal parameters associated with storage of data in the internal storage vault, to produce a plurality of sets of performance encoded data slices, wherein the data object is segmented into a plurality of data segments and wherein each data segment is dispersed storage error encoded into a respective set of performance encoded data slices; and
facilitate storage of the plurality of sets of performance encoded data slices in the internal storage vault.

12. The computer readable storage medium of claim 11, wherein the dispersal parameters associated with the internal storage vault differ from second dispersal parameters associated with storage of data in the second set of storage units.

13. The computer readable storage medium of claim 12, wherein each of the plurality of sets of performance encoded data slices includes n number of performance encoded data slices, and wherein the second set of storage units is configured to store sets of encoded data slices that each include a second number of encoded data slices, the second number being greater than n.

14. The computer readable storage medium of claim 11, wherein the at least one performance criterion includes at least one of: a data type, a data size indicator, a data owner identifier, system registry information, or available capacity level of the internal storage vault.

15. The computer readable storage medium of claim 11, wherein the at least one performance criterion includes at least one of: an estimated access frequency level, a DSN network loading level, or an updated desired access performance level.

16. A computing device of a group of computing devices of a dispersed storage network (DSN), the DSN having storage resources including a first set of storage units and a second set of storage units, the first set of storage units configured as an internal storage vault, the computing device comprises:
an interface;
a local memory; and
a processing module operably coupled to the interface and the local memory, wherein the processing module operates to:
receive, via the interface, a data object for storage in the DSN;
determine, based on at least one performance criterion, to store the data object in the internal storage vault as opposed to the second set of storage units;
dispersed storage error encode the data object, in accordance with dispersal parameters associated with storage of data in the internal storage vault, to produce a plurality of sets of performance encoded data slices, wherein the data object is segmented into a plurality of data segments and wherein each data segment is dispersed storage error encoded into a respective set of performance encoded data slices; and
facilitate storage of the plurality of sets of performance encoded data slices in the internal storage vault.

17. The computing device of claim 16, wherein the dispersal parameters associated with the internal storage vault differ from second dispersal parameters associated with storage of data in the second set of storage units.

18. The computing device of claim 17, wherein each of the plurality of sets of performance encoded data slices includes n number of performance encoded data slices, and wherein the second set of storage units is configured to store sets of encoded data slices that each include a second number of encoded data slices, the second number being greater than n.

19. The computing device of claim 16, wherein the at least one performance criterion includes at least one of: a data type, a data size indicator, a data owner identifier, system registry information, available capacity level of the internal storage vault, an estimated access frequency level, a DSN network loading level, an updated desired access performance level, or a desired data storage reliability level.

20. The computing device of claim 16, wherein the processing module further functions to:
- receive a data recovery request for the data object;
- identify the set of storage units of the internal storage vault;
- issue read slice requests to the identified set of storage units, via the interface, for the performance encoded data slices of the plurality of sets of performance encoded data slices;
- receive, via the interface, the performance encoded data slices; and
- for each respective set of performance encoded data slices, dispersed error decode at least a decode threshold number of received performance encoded data slices to reproduce a data segment of the plurality of data segments.

* * * * *